United States Patent
Kim

(10) Patent No.: US 10,048,797 B2
(45) Date of Patent: *Aug. 14, 2018

(54) DISPLAY DEVICE WITH DATA LINE PRECHARGING AT BOUNDARY BETWEEN TOUCH DRIVING PERIOD AND DISPLAY DRIVING PERIOD

(71) Applicant: LG Display Co., Ltd., Seoul (KR)

(72) Inventor: SungChul Kim, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 6 days.

This patent is subject to a terminal disclaimer.

(21) Appl. No.: 15/405,239

(22) Filed: Jan. 12, 2017

(65) Prior Publication Data

US 2017/0123582 A1 May 4, 2017

Related U.S. Application Data

(63) Continuation of application No. 14/877,543, filed on Oct. 7, 2015, now Pat. No. 9,575,592.

(51) Int. Cl.
*G06F 3/041* (2006.01)
*G06F 3/044* (2006.01)
*G09G 3/36* (2006.01)

(52) U.S. Cl.
CPC ............ *G06F 3/0416* (2013.01); *G06F 3/044* (2013.01); *G09G 3/3688* (2013.01); *G09G 2310/0248* (2013.01); *G09G 2310/08* (2013.01)

(58) Field of Classification Search
None
See application file for complete search history.

(56) References Cited

U.S. PATENT DOCUMENTS

| | | |
|---|---|---|
| 2007/0080905 A1 | 4/2007 | Takahara |
| 2008/0191987 A1 | 8/2008 | Lee et al. |
| 2010/0315403 A1 | 12/2010 | Kaneyoshi et al. |
| 2012/0050217 A1 | 3/2012 | Noguchi et al. |
| 2013/0335367 A1 | 12/2013 | Kim |
| 2014/0204055 A1 | 7/2014 | Lu et al. |
| 2014/0320446 A1 | 10/2014 | Kim et al. |

FOREIGN PATENT DOCUMENTS

| | | |
|---|---|---|
| KR | 10-1331038 | 11/2013 |
| KR | 10-2013-0143415 | 12/2013 |
| KR | 10-2014-0014731 | 2/2014 |
| KR | 10-2014-0074453 | 6/2014 |
| KR | 10-2014-0075542 | 6/2014 |

OTHER PUBLICATIONS

U.S. Appl. No. 14/877,543, filed Jun. 21, 2016, 14 pages.

*Primary Examiner* — Kent W Chang
*Assistant Examiner* — Nathaniel P Brittingham
(74) *Attorney, Agent, or Firm* — Fenwick & West LLP

(57) ABSTRACT

Disclosed is a display device including: a display panel including data lines and gate lines; a touch screen including a plurality of touch screens; a data driving circuit for supplying a data voltage to the data lines; a gate driving circuit for supplying a gate voltage to the gate lines; a touch sensing circuit for applying a driving signal to the touch sensors to sense a change in a voltage or a capacitance value of the touch sensors; and a timing controller for time-dividing a first frame period into a first driving period for sensing the touch sensors and a second driving period for performing display on the display panel, wherein the timing controller performs a control to supply a data voltage to a first area of the first driving period adjacent to a boundary surface between the first driving period and the second driving period.

21 Claims, 10 Drawing Sheets

DISPLAY DEVICE WITH DATA LINE PRECHARGING AT BOUNDARY BETWEEN TOUCH DRIVING PERIOD AND DISPLAY DRIVING PERIOD

CROSS-REFERENCE TO RELATED APPLICATION

This application is a continuation application of, and claims priority under 35 U.S.C. § 120 of, U.S. patent application Ser. No. 14/877,543 filed on Oct. 7, 2015, which is incorporated by reference herein in its entirety.

BACKGROUND OF THE INVENTION

1. Field of the Invention

An embodiment relates to a display device having a touch sensor.

2. Description of the Prior Art

A User Interface (UI) allows a person (user) to communicate with various electric/electronic devices so as to allow the user to easily control the devices as he/she wants. Representative examples of such a UI include a keypad, a keyboard, a mouse, an On-Screen Display (OSD), a remote controller having an infrared-ray communication function or a Radio Frequency (RF) communication function, etc. The UI technology is being developed to increase a user's sensitivity and ease of manipulation. In recent years, the UI is evolving to a touch UI, a voice recognition UI, a 3D UI, etc., and has a tendency of being installed in a portable information device. In order to implement the touch UI, a touch screen is installed in a display element of a home appliance or a portable information device.

Touch sensors constituting the touch screen may be implemented in a capacitive scheme, a resistive scheme, etc. A touch screen using the capacitive scheme has greater durability and a higher visibility than those of a touch screen using the resistive scheme, can perform multi-touch recognition and proximity touch recognition, and thus, is applied to various applications.

A display device including a display element and a touch screen senses a change in a capacitance value of a touch sensor before and after touch (or proximity), so as to determine whether a conductive material comes into contact with (or approaches) the touch screen and a location thereof.

Such a display device is driven according to a time division scheme including a display section and a touch section. However, since a data line of the display device maintains a ground (GND) voltage in the touch section, a data value has very large change at a time point at which the touch section terminates, thereby generating a line dim due to a decrease in the data charging amount.

SUMMARY

In order to solve the above-described problem, an aspect of the present invention is to provide a display device for preventing a line dim from being generated at a boundary between a display section and a touch section.

In various embodiments herein, at least some of the data lines of a display device are precharged to a predetermined voltage during a duration adjacent to the boundary between a touch screen driving period during which the touch driving signal is applied to the touch sensors and a display panel driving period during which display is performed on the display panel. The predetermined voltage may be the data voltage to be applied to the data lines in the display panel driving period or a voltage corresponding to such data voltage. The precharging may occur (i) during a first duration toward the end of the touch screen driving period immediately before the beginning of the display panel driving period, (ii) during a second duration at the beginning of the display panel driving period immediately after the end of the touch screen driving period but prior to activation of the gate lines by the gate drive signals, (iii) during both such first and second durations, or (iv) during any combination of parts of such first and second durations. The gate lines are not activated by the gate drive signals while precharging occurs.

In one embodiment, a display device comprises: a display panel including data lines and gate lines; a touch screen including a plurality of touch sensors; a data driving circuit for supplying a data voltage to the data lines; a gate driving circuit for supplying a gate voltage to the gate lines; a touch sensing circuit for applying a touch driving signal to the touch sensors to sense a touch on the touch screen; and a timing controller for controlling timings of operation of the display device, the display device being operated in a plurality of frame periods, each of the frame periods including at least a first driving period for driving the touch sensors and a second driving period for performing display on the display panel, wherein the data voltage to be applied to one or more of the data lines in the second driving period is applied in advance to the one or more of the data lines in a duration adjacent to a boundary between the first driving period and the second driving period with the gate lines being inactivated, to precharge the one or more of the data lines prior to the gate lines being activated by the gate voltage. A driver circuit and a method of driving the display panel as such may also be provided herein.

The display device according to the embodiments herein have the benefit that a data voltage can be precharged to the data lines prior to activation of the gate lines by the gate voltages during the display driving period, thereby preventing the generation of a line dim resulting from charging shortage of a pixel during the display driving period, and more efficiently stabilizing a common voltage according to a change in data voltage.

BRIEF DESCRIPTION OF THE DRAWINGS

The above and other objects, features and advantages of the present invention will be more apparent from the following detailed description taken in conjunction with the accompanying drawings, in which:

FIGS. 1 to 3 are perspective views schematically illustrating various forms of combinations of a touch screen and a display panel according to an;

DETAILED DESCRIPTION OF THE EXEMPLARY EMBODIMENTS

Hereinafter, an embodiment will be described in detail with reference to the drawings.

Figure 1:
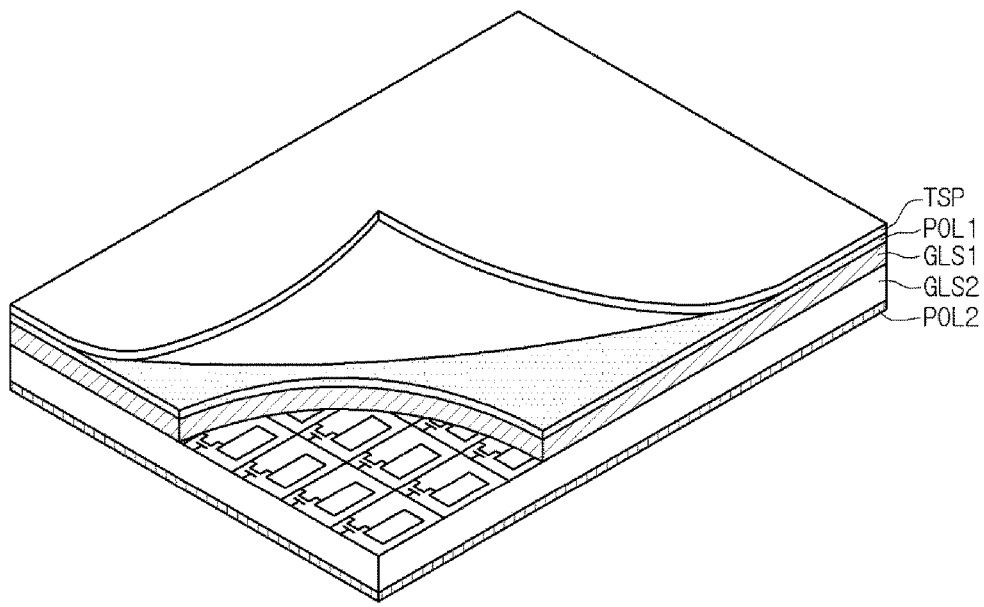
Figure 2:
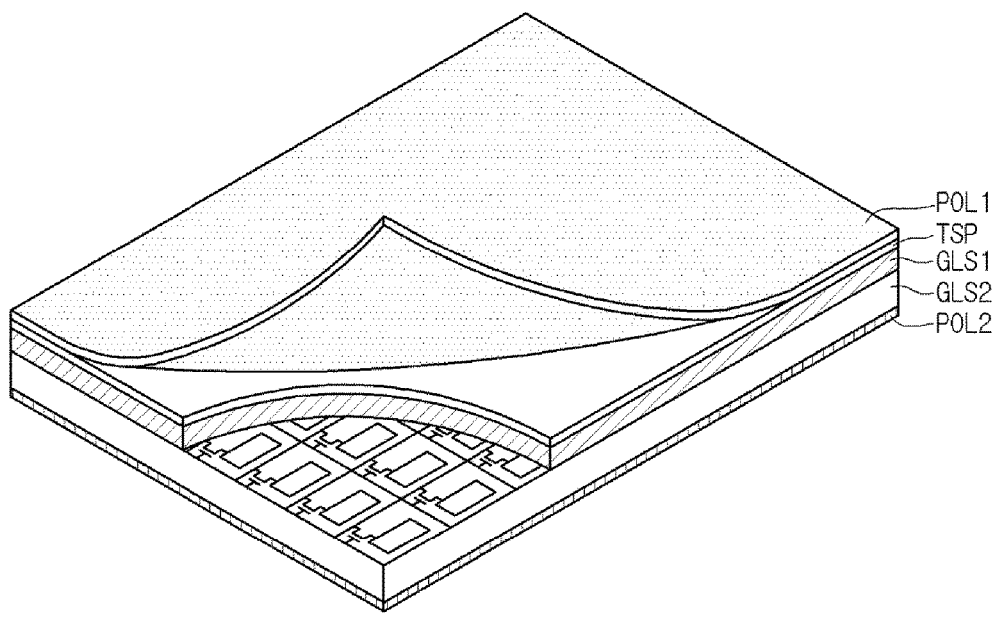
Figure 3:
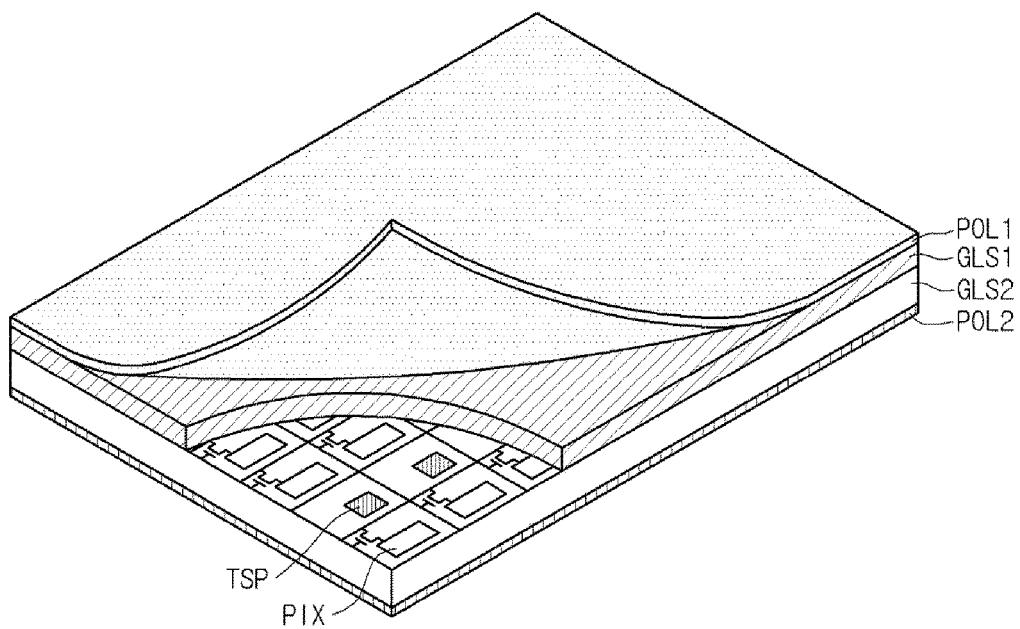
Figure 4:
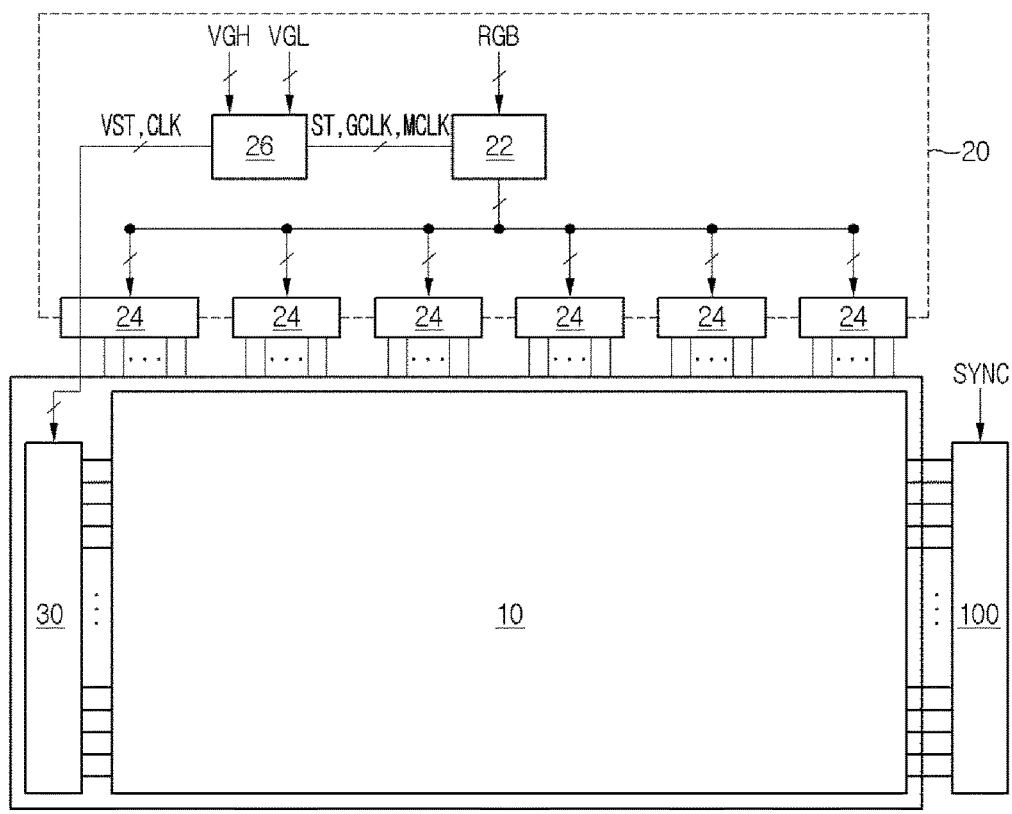
FIG. 4 is a block diagram illustrating a display device according to an embodiment.
Figure 5:
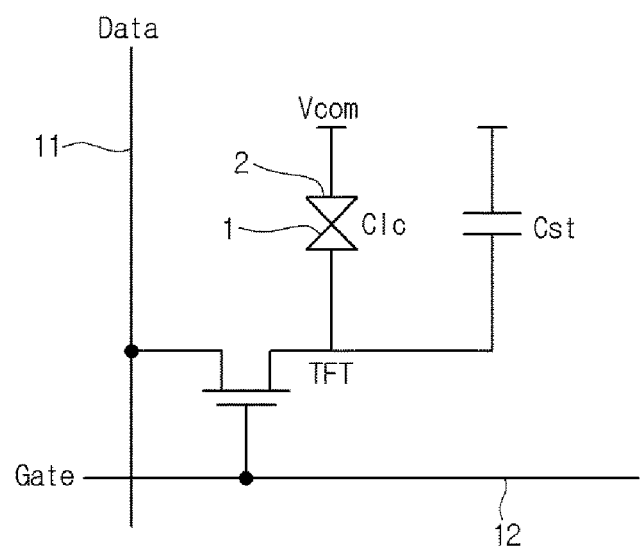
FIG. 5 illustrates an equivalent circuit of a liquid crystal cell.

FIGS. 1 to 3 are perspective views schematically illustrating various types of combinations of a touch screen and a display panel according to an embodiment, FIG. 4 is a block diagram illustrating a display device according to an embodiment, and FIG. 5 illustrates an equivalent circuit of a liquid crystal cell.

A display device according to an embodiment may be implemented on the basis of a flat panel display device such as a Liquid Crystal Display (LCD), a Field Emission Display (FED), a Plasma Display Panel (PDP), an Organic Light Emitting Display (OLED), an ElectroPhoresis Display (EPD), etc. In the following embodiment, although a display device will be described focused on the LCD as an example of the display device, it should be noted that a display device according to an embodiment is not limited to the LCD.

A touch screen TSP may be installed in the display device according to an embodiment as illustrated in FIGS. 1 to 3. The touch screen TSP may be attached to an upper side of an upper polarizing plate POL1 of the display panel as illustrated in FIG. 1 or may be formed between the upper polarizing plate POL1 and an upper substrate GLS1 of the display panel as illustrated in FIG. 2. Further, capacitive sensors of the touch screen TSP may be embedded in a pixel array of the display panel as illustrated in FIG. 3. In FIGS. 1 to 3, the wording "PIX" implies a pixel electrode of a pixel, the wording "GLS2" implies a lower substrate, and the wording "POL2" implies a lower polarizing plate.

The touch screen TSP may be implemented as a capacitive touch screen, which detects a touch (or proximity) input through a plurality of capacitive sensors. The capacitive touch screen is divided into a self-capacitance type and a mutual-capacitance type. The self-capacitance is formed along a conductor wire of a single layer formed in one direction. The mutual-capacitance is formed between two conductor wires orthogonal to each other.

Referring to FIGS. 4 and 5, a display device according to an embodiment includes: a display panel 10, display panel driving circuits 24, 26, and 30, a timing controller 22, a touch sensing circuit 100, etc.

The display panel 10 includes a liquid crystal layer formed between two substrates. The substrates may be manufactured by a glass substrate, a plastic substrate, a film substrate, etc. A pixel array formed on a lower substrate of the display panel 10 includes data lines 11, gate lines 12 orthogonal to the data lines 11, and pixels arranged in a matrix form. The pixel array further includes a plurality of Thin Film Transistors (TFTs) formed in intersection parts between the data lines 11 and the gate lines 12, pixel electrodes 1 for charging pixels with a data voltage, a storage capacitor Cst connected to the pixel electrodes to maintain a pixel voltage, etc.

Pixels of the display panel 10 are arranged in a matrix form defined by the data lines 11 and the gate lines 12. A liquid crystal cell of each of the pixels is driven by an electric field applied according to a voltage difference between a data voltage applied to the pixel electrode 1 and a common voltage applied to the common electrode 2, so as to adjust a transmission amount of incident light. The TFTs are turned on in response to gate pulses from the gate lines to supply a voltage from the data lines 11, to the pixel electrode 1 of the liquid crystal cell. The common electrode 2 may be formed on a lower substrate or an upper substrate.

The display panel 10 may include a black matrix, a color filter, etc. formed on the upper substrate thereof. The polarizing plates are attached to the upper substrate and the lower substrate, respectively, and an alignment film for configuring a pre-tilt angle of a liquid crystal is formed on an inner surface which is in contact with the liquid crystal. A spacer for maintaining a cell gap of the liquid crystal cell is formed between the upper substrate and the lower substrate of the display panel 10.

Such a display panel 10 may be implemented in any well-known liquid crystal mode such as a Twisted Nematic (TN) mode, a Vertical Alignment (VA) mode, an In-Plane Switching (IPS) mode, a Fringe Field Switching (FFS) mode, etc. A backlight unit may be disposed on the rear surface of the display panel 10. The backlight unit is implemented as an edge type or direct type backlight unit to illuminate light to the display panel 10.

The display panel driving circuits input data of an input image to the pixels of the display panel 10 using a data driving circuit 24 and gate driving circuits 26 and 30.

The data driving circuit 24 converts digital video data (RGB) input from the timing controller 22 into a gamma compensation voltage to generate a data voltage. The data driving circuit 24 can supply a data voltage to the data lines 11 under the control of the timing controller 22. In an embodiment, a data inversion scheme applied to the mobile field, e.g. the column inversion scheme, may be used. In this scheme, since polarities of the data lines are not changed, data is changed with reference to previous data.

The gate driving circuits 26 and 30 sequentially supply gate pulses (or scan pulses) synchronized with the data voltage to the gate lines, thereby selecting a line of the display panel 10 to which the data voltage is input. The gate driving circuits include a level shifter 26 and a shift register 30. With development of the Gate-In-Panel (GIP) process technology, the shift register 30 may be directly formed on a substrate of the display panel 10.

The level shifter 26 may be formed on a Printed Circuit Board (PCB) 20 electrically connected to the lower substrate of the display panel 10. The level shifter 26 outputs a start pulse VST and clock signals CLK, which swing between a gate high voltage VGH and a gate low voltage VGL. The gate high voltage VGH is configured to be equal to or higher than a threshold voltage of the TFTs formed in the pixel array of the display panel 10. The gate low voltage VGL is configured to be lower than the threshold voltage of the TFTs formed in the pixel array of the display panel 10.

Such a level shifter 26 outputs the start pulse VST and the clock signals CLK, which are swung between the gate high voltage VGH and the gate low voltage VGL, in response to the start pulse ST, a first clock GCLK, and a second clock MCLK which are input from the timing controller 22. Phases of the clock signals CLK output from the level shifter 26 are sequentially shifted and are then transmitted to the shift resistor 30 formed in the display panel 10.

The shift resistor 30 is formed at an edge of the lower substrate of the display panel 10 having the pixel array formed therein, to be connected to the gate lines 12 of the pixel array. The shift resistor 30 includes a plurality of stages dependently connected to each other.

The shift resistor 30 starts to operate in response to the start pulse VST input from the level shifter 26, and shifts an output in response to the clock signals CLK to sequentially supply a gate pulse to the gate lines 12 of the display panel 10.

The timing controller 22 supplies digital video data input from an external host system, to Integrated Circuits (ICs) of the data driving circuit 24. The timing controller 22 receives, from the external host system, an input of a timing signal such as a vertical synchronization signal Vsync, a Horizontal synchronization signal Hsync, a Data Enable (DE) signal, a clock, etc. to generate a timing control signal used for controlling operation timing. The timing controller 22 or the host system generates a synchronization signal SYNC used for controlling operation timing of the display panel driving circuit and the touch sensing circuit 100.

The touch sensing circuit 100 applies a driving signal to wires connected to capacitance sensors of the touch screen to determine a change in a voltage of the driving signal before and after a touch or a rising edge or falling edge delay time of the driving signal so as to sense a change in a capacitance before and after a touch (or proximity) input. The touch sensing circuit 100 converts a voltage received from the capacitance sensors of the touch screen into digital data to generate touch raw data, and executes a preconfigured touch recognition algorithm to analyze the touch raw data so as to detect a touch (or proximity) input. The touch sensing circuit 100 transmits touch report data including coordinates of a location of the touch (or proximity) input to the host system.

The host system may be implemented in one of a navigation system, a set-top box, a Digital Versatile Disc (DVD) player, a blue-ray player, a Personal Computer (PC), a home theater system, a broadcast receiver, and a phone system. The host system converts digital video data of an input image into a format suitable for a resolution of the display panel 10 using a scaler and transmits a timing signal together with the data to the timing controller 22. Further, the host system executes an application program associated with a touch (or proximity), in response to the touch report data input from the touch sensing circuit 100.

FIGS. 6 to 9 illustrate various embodiments relating to time division driving of a display panel and a touch screen.

Figure 6:
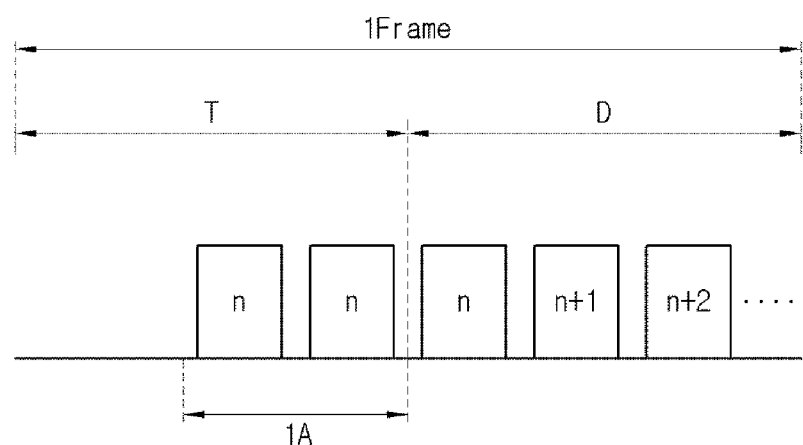
FIG. 6 is a waveform diagram illustrating a time division driving method of a display device according to a first embodiment.

As illustrated in FIG. 6, a first frame section 1Frame may include a first driving period T and a second driving period D. The first driving period T may be a touch screen driving period. The second driving period D may be a display panel driving period. A data voltage can be controlled by the timing controller 22.

During a part of the first driving period T, the display panel driving circuits 24, 26 and 30, for example, the data driving circuit 24 and the gate driving circuits 26 and 30, may not be driven, while the touch sensing circuit 100 is driven. The touch sensing circuit 100 applies a driving signal to wires connected to touch sensors of the touch screen TSP during a partial period of the first driving period T, thereby sensing a voltage change or a capacitance change (RC delay) of the touch sensors. The wires of the touch screen TSP may be Tx lines connected to mutual touch sensors or sensing lines connected to self-touch sensors.

During the second driving period D, the display panel driving circuits 24, 26, and 30 are driven, and the touch sensing circuit 100 is not driven. During a display panel driving period T1, the data driving circuit 24 supplies a data voltage to the data lines 11 under the control of the timing controller 22, and the gate driving circuits 26 and 30 sequentially supply, to the gate lines 12, gate pulses synchronized with the data voltage. The touch sensing circuit 100 does not supply a driving signal to the wires of the touch screen during the display panel driving period T1.

When the first driving period T starts, a data voltage can maintain the ground (GND) voltage during the first driving period T. The data voltage can be supplied toward the end of the first driving period T, e.g. a first duration 1A from among the first driving period T adjacent to a boundary between the first driving period T and the second driving period D. The same data voltage as that would be supplied in the second driving period D can be applied in the first duration 1A of the first driving period T.

In the second driving period D, the nth, (n+1)th, and (n+2)th data voltages may be sequentially supplied. Here, although n+m data voltages may be supplied during the second driving period D, for the convenience, only cases of the nth, (n+1)th, and (n+2)th data voltages will be illustrated. The nth data voltage may be supplied in the first duration 1A of the first driving period T. The nth data voltage may be supplied over 2H (2 horizontal periods of the display) in the first area 1A of the first driving period T. 1H (1 horizontal period) may imply 4 ms to 12 ms.

On an assumption that the present embodiment has a two-division structure, n may correspond to the 641th data voltage. Thus, the 641th data voltage may be supplied over 2H in the first duration 1A of the first driving period T.

As described above, when the data voltage of 2H is supplied in the first area of the first driving period, the present invention can stabilize a common voltage Vcom from charging shortage of a pixel and a change in a data voltage at the nth line.

Figure 7:
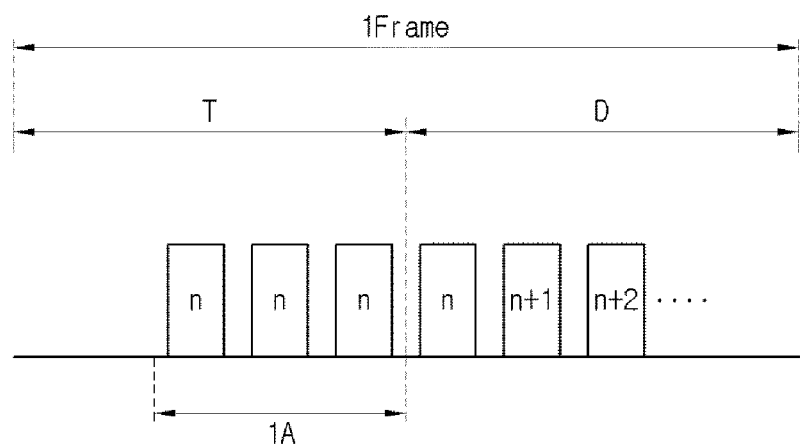
FIG. 7 is a waveform diagram illustrating a time division driving method of a display device according to a second embodiment.

As illustrated in FIG. 7, a first frame section 1Frame may include a first driving period T and a second driving period D. The first driving period T may be a touch screen driving period. The second driving period D may be a display panel driving period. Here, the description duplicative of FIG. 6 will be omitted.

When the first driving period T starts, a data voltage can maintain a ground (GND) voltage during the first driving period T. The data voltage can be supplied toward the end of the first driving period T, e.g. a first duration 1A of the first driving period T adjacent to a boundary between the first driving period T and the second driving period D. A data voltage identical to the data voltage supplied during the second driving period D can be applied during the first duration 1A of the first driving period T.

In the second driving period D, the nth, (n+1)th, and (n+2)th data voltages may be sequentially supplied. Here, although (n+m) data voltages may be supplied during the second driving period D, for the convenience, only cases of the nth, (n+1)th, and (n+2)th data voltages are illustrated. The nth data voltage may be supplied during the first duration 1A of the first driving period T. The nth data voltage may be supplied over 3H (3 horizontal periods) in the first duration 1A of the first driving period T.

Provided that the present embodiment has a two-division structure, n may correspond to a 641th data voltage. Thus, the 641th data voltage can be supplied over 3H in the first duration 1A of the first driving period T.

As described above, the data voltage is supplied over 3H in the first duration of the first driving period, so that the present invention can effectively stabilize a common voltage Vcom from charging shortage of a pixel and a change in a data voltage.

Figure 8:
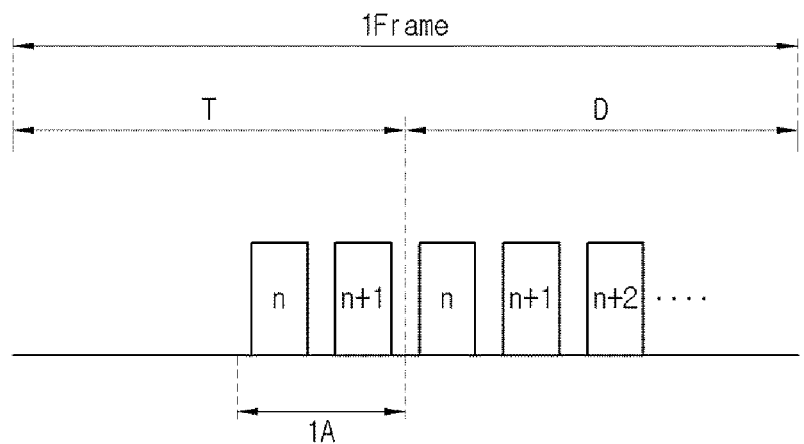
FIG. 8 is a waveform diagram illustrating a time division driving method of a display device according to a third embodiment.

As illustrated in FIG. 8, a first frame section 1Frame may include a first driving period T and a second driving period D. The first driving period T may be a touch screen driving period. The second driving period D may be a display panel driving period. Here, the description duplicative of FIG. 6 will be omitted.

When the first driving period T starts, a data voltage can maintain a ground (GND) voltage during the first driving period T. The data voltage can be supplied toward the end of the first driving period T, e.g. a first duration 1A of the first driving period T adjacent to a boundary between the first driving period T and the second driving period D. A data voltage identical to the data voltage supplied during the second driving period D can be applied during the first duration 1A of the first driving period T.

In the second driving period D, the nth, (n+1)th, and (n+2)th data voltages can be sequentially supplied. Here, although (n+m) data voltages may be supplied during the second driving period D, for the convenience, only cases of the nth, (n+1)th, and (n+2)th data voltages will be illustrated. The nth and (n+1)th data voltages may be supplied during the first duration 1A of the first driving period T.

Provided that the present embodiment has a two-division structure, n may correspond to a 641th data voltage. Thus, the 641th data voltage and the 642th data voltage may be supplied during the first duration 1A of the first driving period T.

As described above, the data voltage is supplied over 2H (2 horizontal periods) within the first duration of the first driving period, so that the present invention can effectively stabilize a common voltage Vcom from charging shortage of a pixel and a change in a data voltage.

Figure 9:
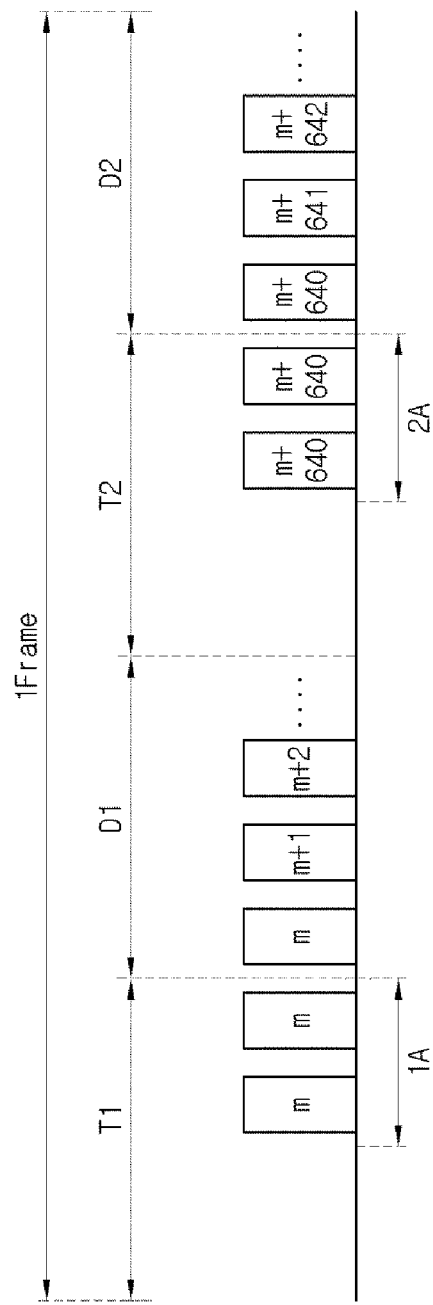
FIG. 9 is a waveform diagram illustrating a time division driving method of a display device according to a fourth embodiment.

As illustrated in FIG. 9, a first frame section 1Frame may include a first driving period T and a second driving period D. The first driving period T may include a first touch screen driving period T1 and a second touch screen driving period T2. The second driving period D may include a first display panel driving period D1 and a second display panel driving period D2. The first driving period T and the second driving period D may be arranged to sequentially alternate with each other. Here, the description duplicative of FIG. 6 will be omitted.

When the first driving period T starts, a data voltage can maintain a ground (GND) voltage during the first touch screen driving periods T1 and T2. The data voltage can be supplied toward the ends of the first touch screen driving period T1 and the second touch screen driving period T2, e.g. a first duration 1A of the first touch screen driving period T1 adjacent to a boundary between the first touch screen driving period T1 and the second display panel driving period D1, and during a second duration 2A of the second touch screen driving period T2 adjacent to a boundary between the second touch screen driving period T2 and the second display panel driving period D2. A data voltage identical to the data voltage to be supplied during the first and second display panel driving periods D1 and D2 can be applied during the first duration 1A of the first touch screen driving period T1 and the second duration 2A of the second touch screen driving period T2, respectively.

In the first display panel driving period D1, the mth, (m+1)th, and (m+2)th data voltages may be sequentially supplied. Accordingly, the mth data voltage may be supplied during the first duration 1A of the first touch screen driving period T1.

In the second display panel driving period D2, the (m+640)th, (m+641)th, and (m+642)th data voltages may be sequentially supplied. Accordingly, the (m+640)th data voltage may be supplied during a second duration 2A of the second touch screen driving period T2.

Provided that the present embodiment has a four-division structure, the 321st data voltage and the 961st data voltage may be supplied during the first duration 1A and the second duration 2A of the first and second touch screen driving periods T1 and T2, respectively.

As described above, the data voltage is supplied during the first duration 1A and the second duration of the first touch screen period T1 and during the second touch screen driving period T2. Therefore, the present invention can effectively stabilize a common voltage Vcom from charging shortage of a pixel and a change in a data voltage.

Figure 10:
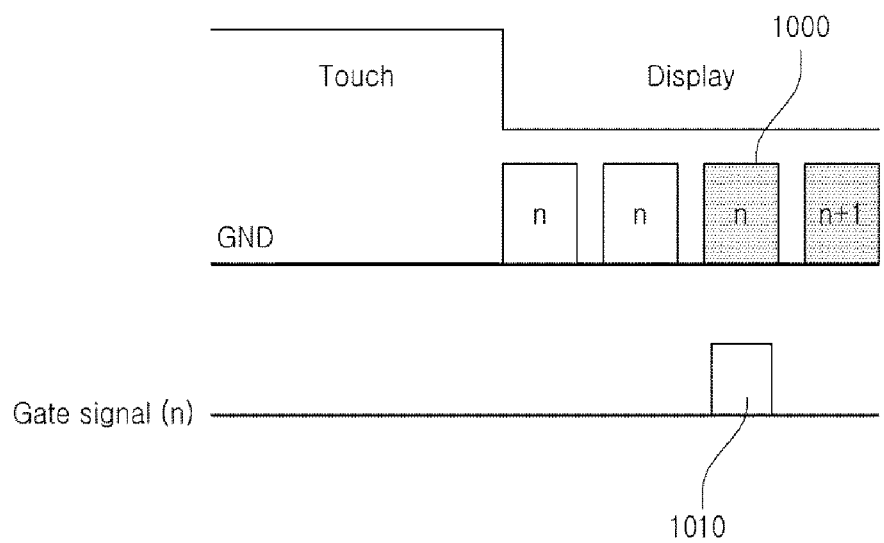
FIG. 10 is a waveform diagram illustrating a time division driving method of a display device according to a fifth embodiment.

FIG. 10 is a waveform diagram illustrating a time division driving method of a display device according to a fifth embodiment.

Referring to FIG. 10, a second driving period (display driving period) for displaying an image sequentially using data voltages from the nth data voltage 1000 may progress after the first driving period (touch screen driving period) for touch sensing.

In this case, in the second driving period, gate lines are sequentially driven from the nth gate line.

Therefore, in order to display an image in the second driving period, the data driving circuit 24 supplies the nth data voltage 1000 through a corresponding data line to the sub-pixel to which a gate signal 1010 has been applied through the nth gate line.

Referring to FIG. 10, during the second driving period (display driving period), the data driving circuit 24 may apply the nth data voltage 1000 as a pre-charge voltage for more than one horizontal period (H) through a corresponding data line in advance, before supplying the nth data voltage 1000 through a data line for actual display.

While the nth data voltage 1000 is applied as a pre-charge voltage in advance, a corresponding gate signal 1010 is not applied to the nth gate line and thus the gate lines 12 are not active during the precharge duration within the display driving period.

In still other embodiments, at least some of the data lines of the display device may be precharged to a predetermined voltage during a duration adjacent to the boundary between a touch screen driving period during which the touch driving signal is applied to the touch sensors and a display panel driving period during which display is performed on the display panel. The precharging may occur (i) during a first duration toward the end of the touch screen driving period immediately before the beginning of the display panel driving period, (ii) during a second duration at the beginning of the display panel driving period immediately after the end of the touch screen driving period but prior to activation of the gate lines by the gate drive signals, (iii) during both such first and second durations, and (iv) during any combination of parts of such first and second durations. The gate lines are not activated by the gate drive signals while precharging occurs.

In one embodiment, the predetermined voltage to which the data lines are precharged may be the data voltage to be displayed during the display panel driving period, or a voltage that corresponds to such data voltage to be displayed during the display panel driving period. In another embodiment, the predetermined voltage to which the data lines are precharged may correspond to a voltage that is near a common voltage (Vcom) of the display device within a margin of approximately 10 percent of a maximum data voltage (Vdd, i.e., the maximum gamma reference voltage) to be displayed in the display panel driving period. In other embodiments, the predetermined voltage to which the data lines are precharged may be ½ of Vdd (the maximum gamma reference voltage), Vcom, Vblack (the black level data voltage for an IPS type LCD panel), Vwhite (the white level data voltage for a TN type LCD panel), etc. The precharging may occur over any appropriate duration, such as 1H, 2H, 3H.

While the embodiments of FIGS. 6-10 are illustrated with the each frame beginning with a touch driving period T followed by a display driving period D, that is merely for illustration purposes. In other embodiments, each frame of the display device may begin with a first display driving period followed by a first touch driving period, followed by a second display driving period and followed by a second touch driving period, and so on. In such other embodiments, precharging of the display lines according to the embodiments herein may or may not be carried before the very first display driving period, but precharging of the display lines is carried out at subsequent boundaries, for example, at the boundary between the first touch driving period and the second display driving period, and so on.

Although the description in the above is made with reference to the drawings and the embodiments, it can be understood that those skilled in the art can variously modify and change the embodiments without departing from the technical spirit of embodiments of the following appended claims.

What is claimed is:

1. A display device comprising:
   a display panel including data lines and gate lines and a plurality of touch sensors;
   a data driving circuit for supplying a data voltage to the data lines;
   a gate driving circuit for supplying a gate voltage to the gate lines;
   a touch sensing circuit for applying a touch driving signal to the touch sensors to sense a touch; and
   a timing controller for controlling timings of operation of the display device, the display device being operated in a plurality of frame periods, each of the frame periods including at least one first driving period for driving the touch sensors and at least one second driving period for performing display on the display panel,
   wherein a first data voltage to be applied to one or more of the data lines in the second driving period is applied in advance to the one or more of the data lines before the second driving period, to precharge the one or more of the data lines.

2. The display device of claim 1, wherein the first data voltage, a second data voltage, and a third data voltage are sequentially supplied to the one or more of the data lines during the second driving period, and the first data voltage is applied to the one or more of the data lines in advance before the second driving period.

3. The display device of claim 2, wherein the first data voltage is applied to the one or more of the data lines over 2H or 3H in advance before the second driving period, H corresponding to a horizontal period of the display device.

4. The display device of claim 1, wherein the first data voltage, a second data voltage, and a third data voltage are sequentially supplied to the one or more of the data lines during the second driving period, and the first data voltage and the second data voltage are applied to the one or more of the data lines in advance before the second driving period.

5. The display device of claim 4, wherein the first data voltage and the second data voltage are applied to the one or more of the data lines over 2H or 3H in advance before the second driving period, H corresponding to a horizontal period of the display device.

6. The display device of claim 1, wherein the first data voltage is applied to the one or more of the data lines prior to activation of the gate lines by the gate voltage during the second driving period.

7. The display device of claim 1, wherein the first data voltage is further applied to the one or more of the data lines after a beginning of the second driving period but prior to activation of the gate lines by the gate voltage during the second driving period.

8. A driver circuit for a display device comprising a display panel including data lines, gate lines, and a plurality of touch sensors, the display device being operated in a plurality of frame periods, each of the frame periods including at least one first driving period for driving the touch sensors and at least one second driving period for performing display on the display panel, the driver circuit comprising:
   a data driving circuit for supplying a data voltage to the data lines; and
   a touch sensing circuit for applying a touch driving signal to the touch sensors to sense a touch, and
   wherein a first data voltage to be applied to one or more of the data lines in the second driving period is applied in advance to the one or more of the data lines before the second driving period, to precharge the one or more of the data lines.

9. The driver circuit of claim 8, wherein the first data voltage, a second data voltage, and a third data voltage are sequentially supplied to the one or more of the data lines during the second driving period, and the first data voltage is applied to the one or more of the data lines in advance before the second driving period.

10. The driver circuit of claim 9, wherein the first data voltage is applied to the one or more of the data lines over 2H or 3H in advance before the second driving period, H corresponding to a horizontal period of the display device.

11. The driver circuit of claim 8, wherein the first data voltage, a second data voltage, and a third data voltage are sequentially supplied to the one or more of the data lines during the second driving period, and the first data voltage and the second data voltage are applied to the one or more of the data lines in advance before the second driving period.

12. The driver circuit of claim 11, wherein the first data voltage and the second data voltage are applied to the one or more of the data lines over 2H or 3H in advance before the second driving period, H corresponding to a horizontal period of the display device.

13. The driver circuit of claim 8, wherein the first data voltage is applied to the one or more of the data lines prior to activation of the gate lines during the second driving period.

14. The driver circuit of claim 8, wherein the first data voltage is further applied to the one or more of the data lines after a beginning of the second driving period but prior to activation of the gate lines during the second driving period.

15. A method for driving a display device comprising a display panel including data lines, gate lines, and a plurality of touch sensors, the display device being operated in a plurality of frame periods, each of the frame periods including at least one first driving period for driving the touch sensors and at least one second driving period for performing display on the display panel, the method comprising:
   supplying a data voltage to the data lines; and
   applying a touch driving signal to the touch sensors to sense a touch, and
   wherein a first data voltage to be applied to one or more of the data lines in the second driving period is applied in advance to the one or more of the data lines before the second driving period, to precharge the one or more of the data lines.

16. The method of claim 15, wherein the first data voltage, a second data voltage, and a third data voltage are sequentially supplied to the one or more of the data lines during the second driving period, and the first data voltage is applied to the one or more of the data lines in advance before the second driving period.

17. The method of claim 16, wherein the first data voltage is applied to the one or more of the data lines over 2H or 3H in advance before the second driving period, H corresponding to a horizontal period of the display device.

18. The method of claim 15, wherein the first data voltage, a second data voltage, and a third data voltage are sequentially supplied to the one or more of the data lines during the second driving period, and the first data voltage and the second data voltage are applied to the one or more of the data lines in advance before the second driving period.

19. The method of claim 18, wherein the first data voltage and the second data voltage are applied to the one or more of the data lines over 2H or 3H in advance before the second driving period, H corresponding to a horizontal period of the display device.

20. The method of claim 15, wherein the first data voltage is applied to the one or more of the data lines prior to activation of the gate lines during the second driving period.

21. The method of claim 15, wherein the first data voltage is further applied to the one or more of the data lines after a beginning of the second driving period but prior to activation of the gate lines during the second driving period.

* * * * *